(12) United States Patent
Elie-Dit-Cosaque et al.

(10) Patent No.: US 8,467,286 B2
(45) Date of Patent: Jun. 18, 2013

(54) LOAD BALANCING AND FAULT PROTECTION IN AGGREGATION NETWORKS

(75) Inventors: David Elie-Dit-Cosaque, Allen, TX (US); Ativa Suhail, Plano, TX (US); Kamakshi Sridhar, Plano, TX (US)

(73) Assignee: Alcatel Lucent, Paris (FR)

( * ) Notice: Subject to any disclaimer, the term of this patent is extended or adjusted under 35 U.S.C. 154(b) by 175 days.

(21) Appl. No.: 12/317,891

(22) Filed: Dec. 30, 2008

(65) Prior Publication Data
US 2010/0165831 A1    Jul. 1, 2010

(51) Int. Cl.
*G01R 31/08* (2006.01)

(52) U.S. Cl.
USPC .......................................... 370/217; 370/403

(58) Field of Classification Search
None
See application file for complete search history.

(56) References Cited

U.S. PATENT DOCUMENTS

| | | | |
|---|---|---|---|
| 6,081,512 A * | 6/2000 | Muller et al. | 370/256 |
| 7,154,861 B1 * | 12/2006 | Merchant et al. | 370/254 |
| 7,345,991 B1 * | 3/2008 | Shabtay et al. | 370/221 |
| 7,590,120 B2 * | 9/2009 | Shuen et al. | 370/392 |
| 7,684,410 B2 * | 3/2010 | Wackerly | 370/395.53 |
| 2008/0285460 A1 * | 11/2008 | Oren et al. | 370/238 |

* cited by examiner

*Primary Examiner* — Kevin C Harper
*Assistant Examiner* — Samina Choudhry
(74) *Attorney, Agent, or Firm* — Garlick & Markison (57) ABSTRACT

A system, device, and method for aggregating traffic in a network, such as for wireless backhaul traffic in a cellular communication system. UE device traffic is sent to and from an access bridge, which is one node in an access network formed into a ring topology, and from the access bridge to a core bridge in communication with a core network of the communication system. According to a preferred embodiment, the access bridge and the core bridge each have a LAG component configured according to IEEE 802.1D and IEEE 802.3-2005, and a ring component configured according to IEEE 802.1Q or 802.1AD. In operation, this LAG component load balances communication traffic coming into the bridge node onto one of two VLANs formed of portions of the access network ring. In the event of a fault condition affecting one of the two VLANs, the fault VLAN is removed from the aggregation scheme until the fault condition is alleviated.

20 Claims, 5 Drawing Sheets

LOAD BALANCING AND FAULT PROTECTION IN AGGREGATION NETWORKS

FIELD OF THE INVENTION

This invention relates generally to the field of wireless communication systems and, more particularly, to a device, system, and method providing fault protection and load balancing in aggregation networks.

BACKGROUND OF THE INVENTION

Communication networks include a large number of interconnected components that enable a UE (user equipment) device with network access to communicate with other such devices located within the network coverage area, and with devices connected through other networks as well. The architecture of any communication system in modern use is generally somewhat hierarchical, that is, widely-disbursed access points allow users to connect with a more centralized core network, which is able to route the voice and data information involved in a great many communication sessions.

For example, a wireless network includes many access nodes, typically antennas connected to BTSs (base transceiver stations), distributed over the network coverage area. A network subscriber using an appropriate device can establish communication with the network though one of these access nodes. During a communication session, voice and data information transmitted to the access node is then relayed to a core network for routing to its destination. Information destined for the subscriber is sent to the appropriate access node for transmission to the UE device.

A wireless network coverage area is often divided into cells, or relatively-small geographic areas having (normally one) antenna for radio-frequency communication with UE devices located within or near the cell. The advantage of a cellular network is that mobile phones can transmit at relatively low power to a near-by antenna, which conserves UE battery power and also allows the reuse of the same frequency channels in non-adjacent cells separated by only a relatively-small distance.

For efficiency, a number of access nodes may be grouped together into an access network, which aggregates the voice and data traffic associated with many UEs for communication with the core network through one or a limited number of network nodes. In a wireless network, this process is sometimes referred to as wireless backhaul. There are several network architectures that may be employed for constructing the access network for backhauling.

Ethernet is one such architecture. An Ethernet network is one that is configured and operated according to the standard IEEE 802.3 and a number of related standards. For example, IEEE 802.1Q and IEEE 802.1AD specify the configuration of virtual bridged local area networks and provider virtual bridged local area networks, respectively, including VLAN (virtual local area network) tagging, and IEEE 802.1D specifies the configuration of MAC (media access control) bridges, including the use of STP (spanning tree protocol).

Ethernet networks may be organized or configured into "rings". A ring configuration is formed by examining a set of Ethernet nodes capable of routing information traffic, and determining a manner of routing that provides a pair of redundant paths from an originating node to a destination node. Note that in this sense, the term "ring" is a general topological reference, but does not necessarily connote a specific physical layout. Nor does the term imply that traffic is ordinarily routed in a loop or circular path. The nature of a ring, as that term is used here, will become more apparent in light of the exemplary embodiments described below.

There are different ways for implementing Ethernet configurations in the wireless backhaul context. One way, for example, is to provide a plurality of suitably interconnected bridges running a routine referred to as STP (spanning tree protocol). While STP is relatively cost-effective, in the event of a fault, that is a breakdown somewhere in the configured ring, the recovery procedure it provides may be too slow to qualify as carrier-grade operation. Another example is a RPR (resilient packet ring) scheme, which provides better fault protection than STP but has not proven cost-effective and probably for this reason has been implemented on only a limited basis.

Needed, then, is a solution for wireless backhaul aggregation networks that is not only acceptable from a cost perspective but also provides adequate load balancing and fault protection in operation.

SUMMARY OF THE INVENTION

The system, device, and method embodiments of the present invention provide for efficient aggregation of data in a communication system, for example in a wireless network employing an Ethernet network as an access network for backhaul aggregation to a core network.

In one aspect, the present invention is a network node for use in an Ethernet ring network, including a LAG component configured according to IEEE 802.1D and IEEE 802.3-2005 and including a first port for receiving communications from non-ring entities as well as a second port and a third port for forwarding the received communications as untagged frames to a ring component configured according to IEEE 802.1Q or IEEE 802.1AD. The ring component includes a first port and a second port for sending tagged frames on, respectively, a first VLAN and a second VLAN formed in the Ethernet ring network, and also includes a third port and a fourth port for receiving untagged frames from, respectively, the second port and the third port of the LAG component.

In another aspect, the present invention is a method of aggregating traffic to a core network via an access network comprising a plurality of network nodes, including the steps of forming a ring topology of the plurality of network nodes, selecting a core bridge from among the plurality of nodes in the ring, the core bridge for communicating with the core network, and establishing an access bridge. Preferably both the core bridge and the access bridge include a ring component and a LAG component. The method further includes the steps of enabling LAG protocol traffic forwarding from the access bridge, configuring a first VLAN and a second VLAN, each including a portion of the plurality of network nodes and extending from the access bridge to the core bridge. The traffic is then load balanced, that is, transmitted in a load-balanced fashion, the access bridge to the core via the first VLAN and the second VLAN.

In yet another aspect, the present invention is a communication system formed of a plurality of access nodes and configurable into a ring topology, wherein the plurality of access nodes includes at least a first bridge node and a second bridge node, each bridge node including a ring component for establishing a first VLAN of a first subset of the plurality of access odes and a second VLAN of a second subset of the plurality of access nodes, and each bridge node further including a LAG component in communication with the ring component, the LAG component for communicating with an entity outside of the plurality of access nodes.

In yet another aspect, the present invention is an access network including a plurality of access nodes, the access network for aggregating communication-system traffic between a core network and one or more user devices. The access network according to this aspect of the present invention includes at least two bridge nodes, each bridge node including both a ring component and a LAG component.

BRIEF DESCRIPTION OF THE DRAWINGS

The foregoing and other advantages of the invention will become apparent upon reading the following detailed description and upon reference to the drawings, in which.

DESCRIPTION OF THE PREFERRED EMBODIMENT(S)

The present invention is directed to a manner of using an access network formed in a ring configuration to aggregate communication traffic. As one example, the access network may be an Ethernet ring used for aggregating wireless backhaul traffic to a core network.

Figure 1:
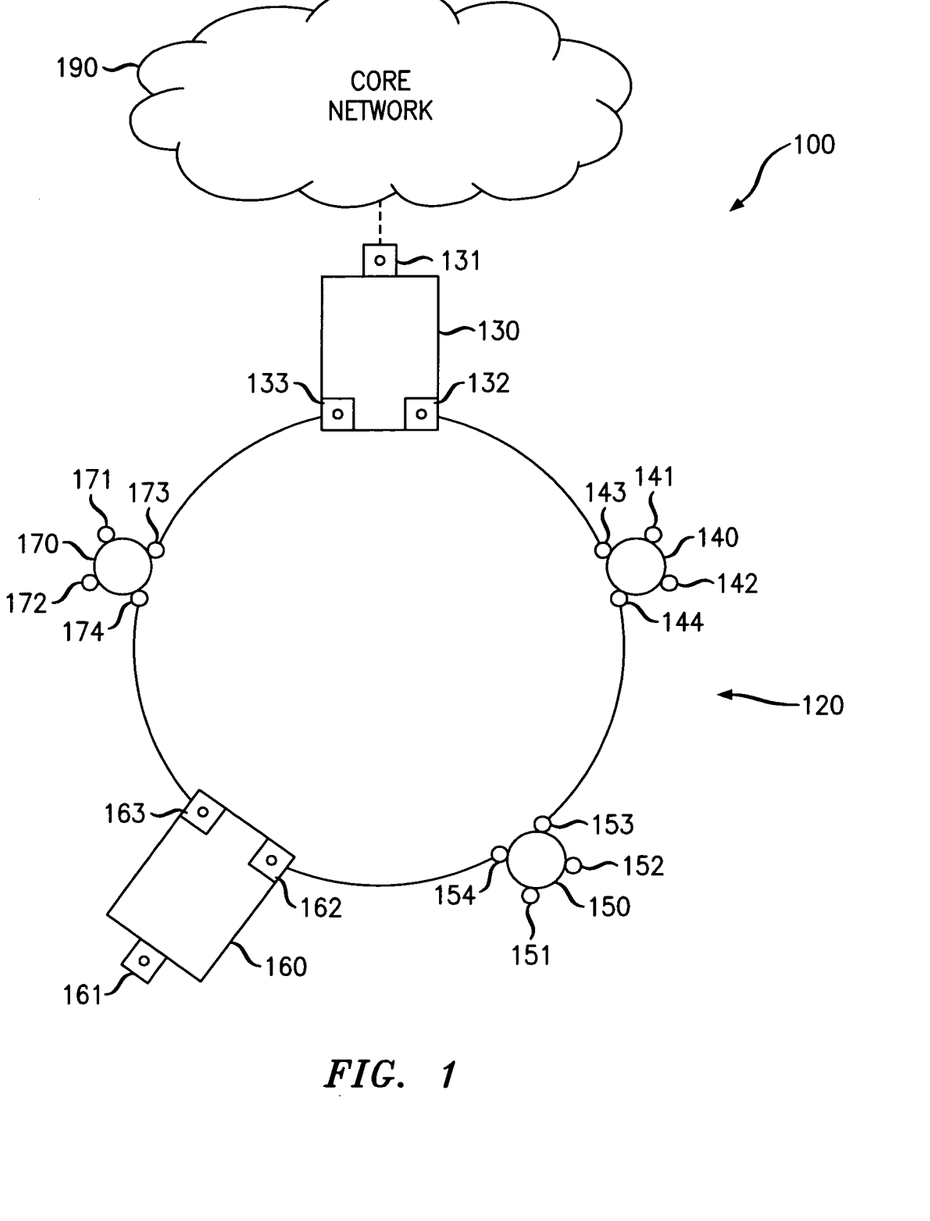
FIG. 1 is a block diagram of a communication system illustrating an access network including a plurality of access nodes that may be configured to aggregate traffic between the access nodes and the core network.

FIG. 1 is a block diagram of a communication system 100 illustrating an access network 120 including a plurality of access nodes that may be configured to aggregate traffic between the access nodes and the core network 190. In this embodiment, communication system 100 is a cellular telephone system, and access network 120 is configured as the interface between users of the system and the core network 190 though which a majority of voice and data traffic may be routed toward its final destination.

In the embodiment of FIG. 1, access network 120 includes access nodes 130, 140, 150, 160, and 170. Note that the present invention requires no particular access node configuration unless explicitly stated in claiming a particular embodiment or apparent from the context. These nodes are formed in a ring formation, meaning that any one node may communicate with others in the access network via either of two neighbor nodes accessible though a first or second port, respectively. For example, node 140 may forward frames destined for any of the other nodes through first port 143. Node 130 receives frames at its first port 132 and, if the frames are directed to a different node of the access network, forwards them in the appropriate direction. Frames addressed to node 160, for example, will be placed on the second port 133 of node 130 and received at first port 173 of node 170. Node 170, in turn, forwards the frames on port 174 to the second port 163 of node 160, their final destination. In the other direction, node 140 could also have forwarded the frames on second port 144 to its neighbor node 150, where they would be received on first port 153 and forwarded on second port 154 to be received on a first port 162 of node 160.

Briefly, nodes 140, 150, and 170 are illustrated in FIG. 1 as access nodes. For simplicity, each of these nodes will be described herein as having a first port (143, 153, and 173, respectively) and a second port (144, 154, and 174, respectively) that receive and forward frames on the ring itself. Each of them is also illustrated as having two additional ports; a third port (141, 151, and 171, respectively) and a fourth port (142, 152, and 172, respectively). The additional ports are for other (non-ring) communications, such as for communicating with UE (user equipment) devices via BTSs (base transceiver stations) and so forth. Of course, each node may well have more (or in some cases fewer) ports than are illustrated here. And ports may be re-assigned for ring or non-ring communication as needed.

Nodes 130 and 160 serve special roles in implementing the present invention and are illustrated differently for this reason. Node 130 is, in the embodiment of FIG. 1, a core bridge that communicates between the ring-topology access network 120 and the core network 190 via, for example, a port 131. Core bridge 130 is also shown as having a first port 132 and a second port 133 that communicate, respectively, with the first port 143 of access node 140 and the first port 173 of access node 170. Node 136 is, in the embodiment of FIG. 1, an access bridge that communicates between the ring-topology access network 120 and various UEs via, for example, a port 161, which may be in communication with one or more BTSs or similar components. Access bridge 160 is also shown as having a first port 162 and a second port 163 that communicate, respectively, with the second port 154 of access node 150 and the second port 174 of access node 170. Again, core bridge 130 and access bridge 160 may have additional ports for other functions, and ports may be re-assigned from one function to another. In addition, it is noted here that any properly-configured node of access network 120 may serve as an access bridge or a core bridge according to the present invention. It is preferable, in fact, that each access node be able to function as an access node for transmitting user traffic to and from the core network.

Figure 2:
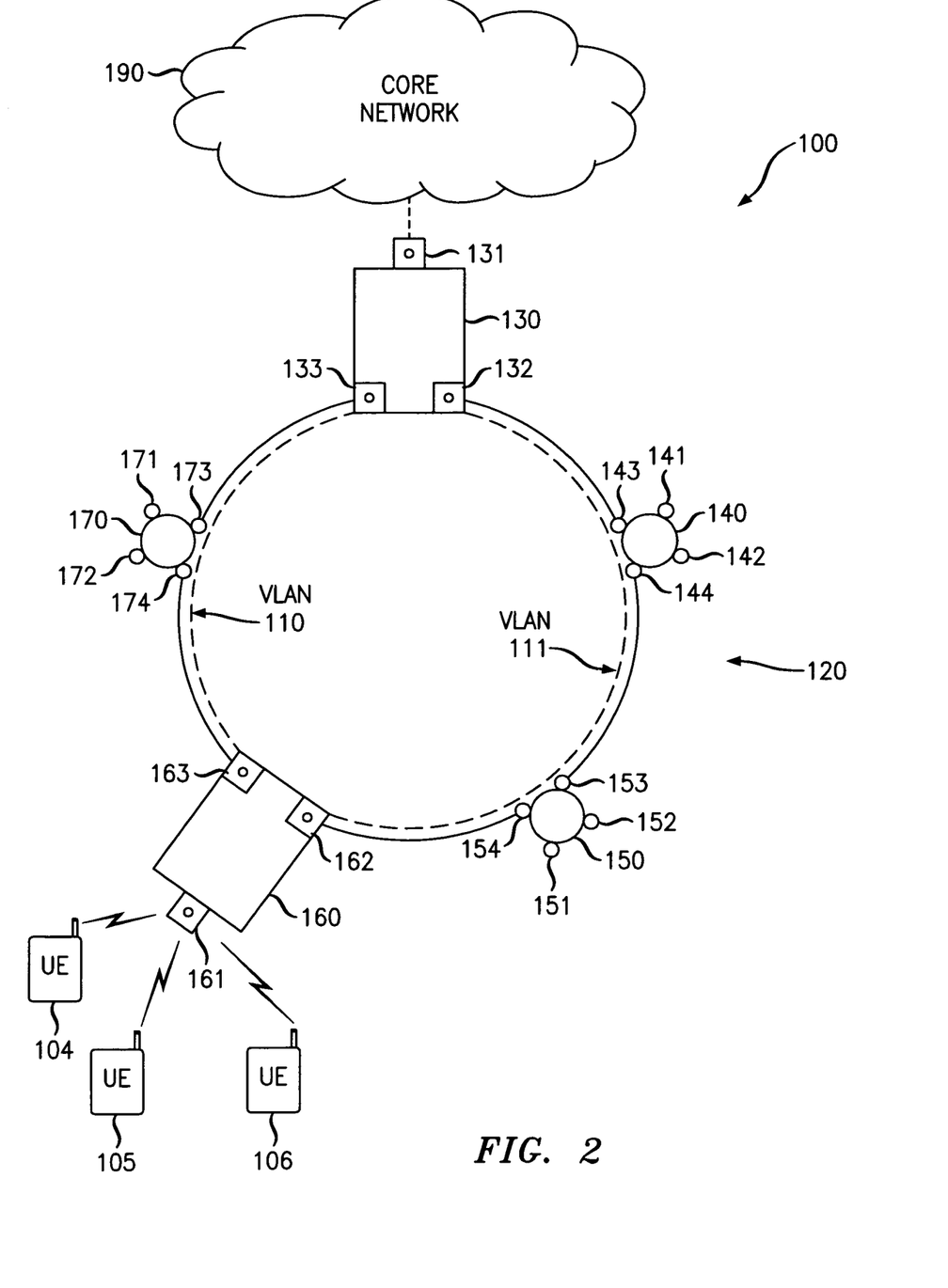
FIG. 2 is a block diagram of a communication system illustrating the access network of FIG. 1 configured to according to an embodiment of the present invention.

FIG. 2 is a block diagram of communication system 100 illustrating the access network 120 of FIG. 1 configured to according to an embodiment of the present invention. Specifically, FIG. 2 illustrates (using broken lines) the configuration of two VLANs, namely, VLAN 110 and VLAN 111. VLAN 110 extends from the second port 163 of access bridge 160 to the second port 133 of core bridge 130, and includes node 170. VLAN 111 extends from the first port 162 of access bridge 160 to the first port 132 of core bridge 130, and includes nodes 140 and 150. Note that while only a relative few nodes make up the two VLANs, in most actual implementations there are expected to be a much larger number VLAN 110 and VLAN 111 are used to aggregate traffic between access bridge 160 and the core network via core bridge 190 in a load balanced manner. The configuration of an access bridge or core bridge according to the present invention will now be described in greater detail.

Figure 3:
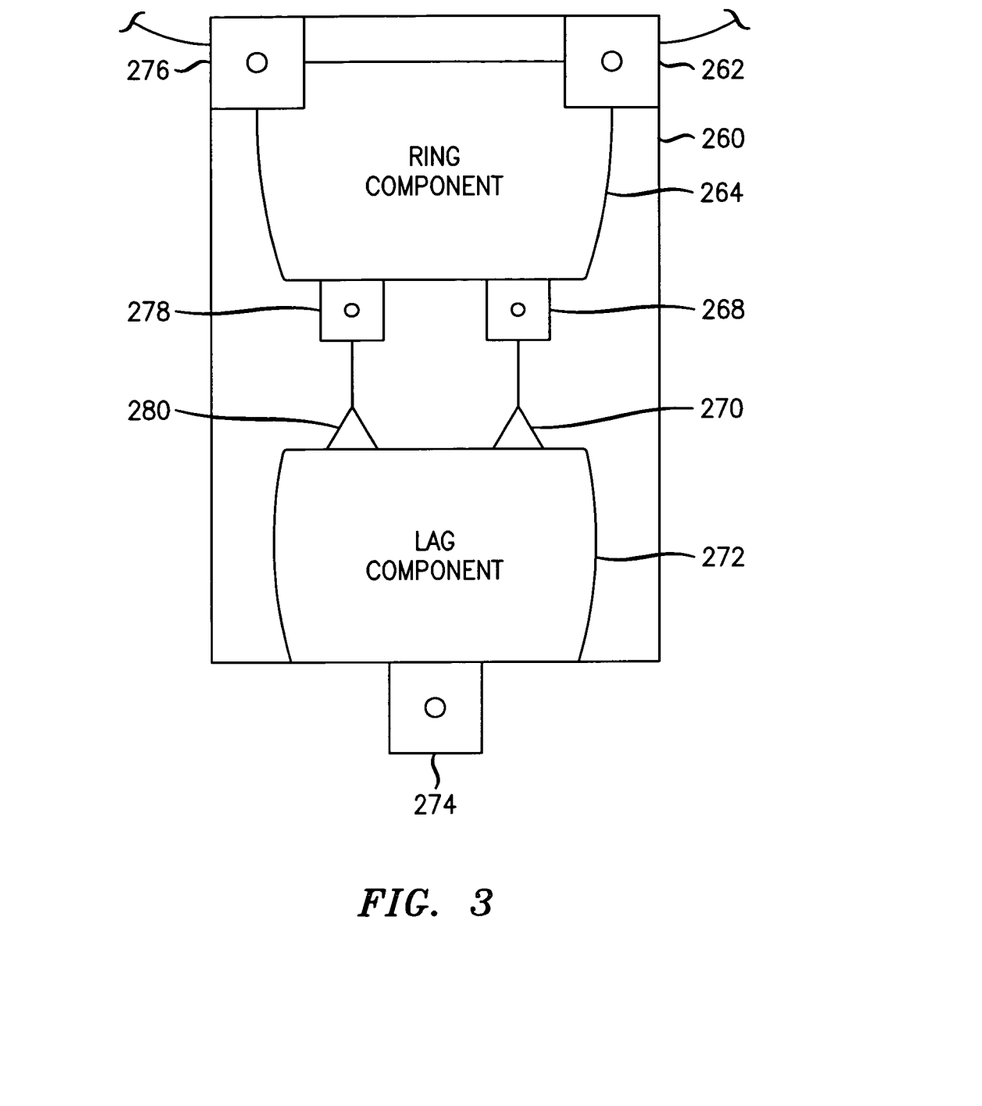
FIG. 3 is a block diagram illustrating the configuration of a bridge node according to an embodiment of the present invention.

FIG. 3 is a block diagram illustrating the configuration of a bridge node 260 according to an embodiment of the present invention. Bridge node 260 may be, in this embodiment, either an access bridge or a core bridge. Although there may be differences between the two nodes in certain implementations, they both include the same or analogous essential features in accordance with the present invention. Specifically, bridge node 260 includes a ring component 264 having a first port 262 and a second port 276 that, in implementation, will send and receive frames via, respectively, a first and second VLAN. These frames will be appropriately tagged for delivery to their proper destination. In a preferred embodiment, the ring component is configured to operate in compliance with specification IEEE 802.1Q or IEEE 802.1AD.

Bridge node 260 also includes a LAG (link aggregation) component 272, so-called herein because it is configured in compliance with IEEE 802.1D and 802.3-2005. Lag component 272, as shown in FIG. 3, includes a port 274 for non-ring communications. In the case of an access node, this may include communications with UE devices such as mobile telephones over a wireless interface, for example, via an antenna connected to a BTS. Note that while other components may be required or desirable for such communications, their exact number and configuration is not important to describing the present invention. If bridge node 260 is assigned as a core bridge in accordance with the present invention, port 274 will be for communication with a component of the core network.

Lag component 272 and ring component 264 must of course be able to communicate with each other. Note that they may or may not, however, be co-located within the same physical component. In case the two components are not collocated the required forwarding of LACP (link aggregation control protocol) control frames is ensured by 802.1ab-REV and MEF 10 (Metro Ethernet Forum 10). In the embodiment of FIG. 3, LAG component 272 includes a port 270 and a port 280, which communicate, respectively, with ring component port 268 and ring component port 278. In operation, the LAG component 272 load balances incoming (for example, via port 274) traffic by forwarding it toward its destination on either one of a first VLAN, originating at ring component first port 262, or a second VLAN originating at ring component second port 276. Ring component port 268 is configured with a PVID (port VLAN identifier) identified with the first VLAN and ring component port 278 configured with a PVID associated with the second VLAN. As untagged frames arrive at ports 268 and 278, they are tagged for sending on the first and second VLANs, respectively. The tagged frames are sent on ports 262 and 276.

By aggregating traffic in this manner, for example, using the access network 120 via VLAN 110 and 111 (shown in FIGS. 1 and 2), load balancing is achievable for the ring configuration. The present invention also facilitates efficient fault protection as well, as described with reference to FIG. 4.

Figure 4:
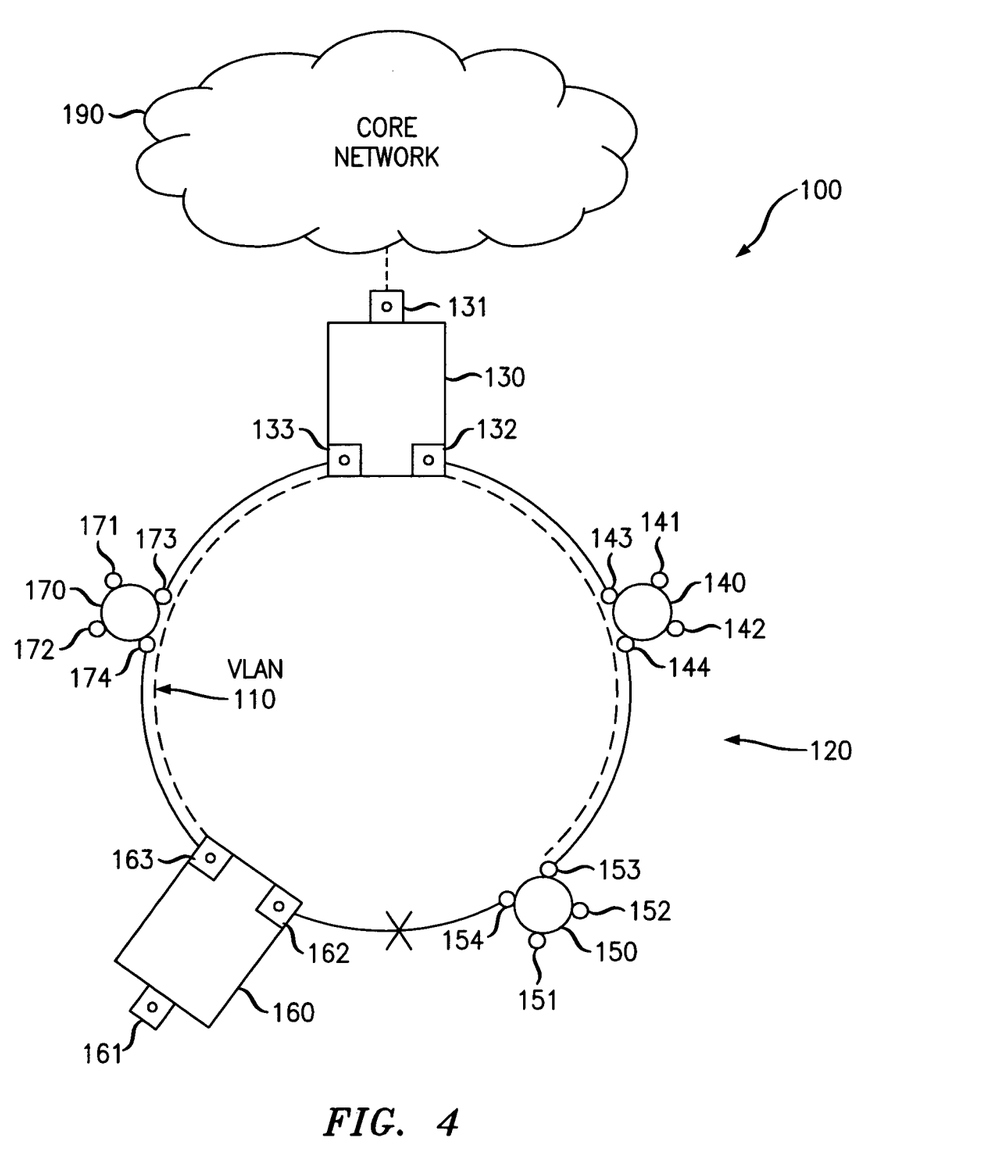
FIG. 4 is a block diagram of a communication system illustrating the occurrence of an exemplary fault condition in the access network of FIG. 1 while configured to according to the embodiment of FIG. 2.

FIG. 4 is a block diagram of a communication system 100 illustrating the occurrence of an exemplary fault condition in the access network 120 of FIG. 1 while configured to according to the embodiment of FIG. 2. In the example of FIG. 4, a fault has occurred between nodes 150 and 160. This could, of course, involve a problem with either or both of those nodes or with the transmission medium between them.

The fault may be detected, for example, by the absence of CCMs periodically sent for this purpose by MEPs (maintenance end points; not separately shown) on the LAG component. In either case, traffic from access bridge 160 can no longer be successfully sent to the core bride via (former) VLAN 111 (the "fault VLAN"), which now extends only from port 153 of node 150 to port 132 of node 130. Former VLAN 111 is therefore not a useful part of the aggregation scheme.

When the relevant LAG component of either the access bridge 160 or the core bridge 130 receives notification that a VLAN is not available do to a fault, it removes the port on the LAG component corresponding to the fault VLAN from the current aggregation scheme and instead forwards traffic on the port on the LAG component corresponding to the operational VLAN. As should be apparent, the VLAN 110 is, in this scenario, already configured, and no further convergence or reconfiguration is required. In many cases, this allows for faster recovery than with existing schemes, such as those employing STP.

Figure 5:
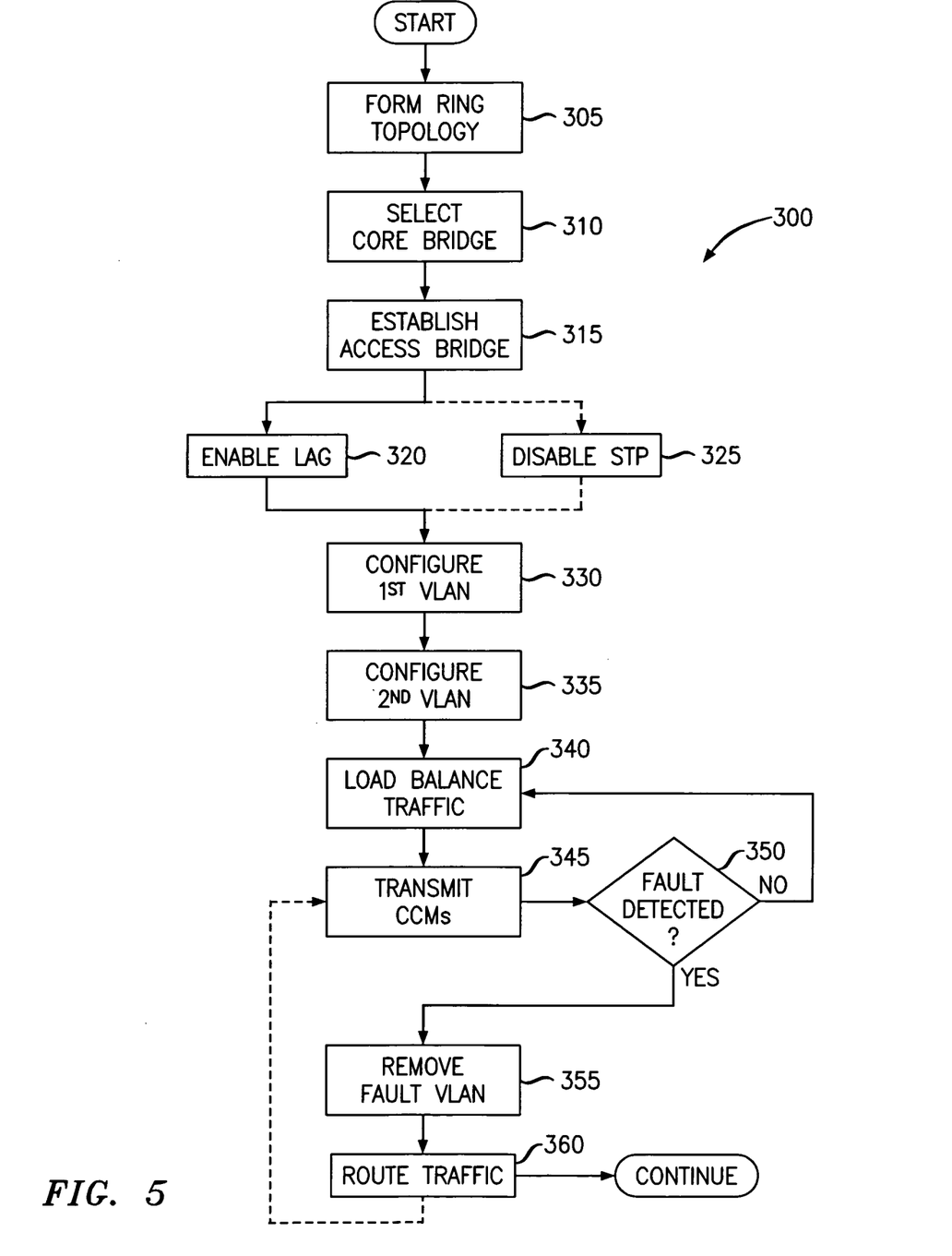
FIG. 5 is a flow diagram illustrating a method for aggregating communication traffic in an access network according to one embodiment of the present invention.

FIG. 5 is a flow diagram illustrating a method 300 for aggregating communication traffic in an access network according to one embodiment of the present invention. At START it is assumed that the components necessary to performing the method 300 are both available and operational. The process then begins with forming a plurality of nodes into a ring topology (step 305). In a ring topology, each network node in the ring has two neighbor nodes with which it may communicate through identified ports. When the nodes of the ring are operational, each node in the ring may communicate with any other ring node via either of its two neighbor nodes. Note that the network nodes forming the ring topology may be physically connected into a ring, or may simply configure available ports to form a functioning ring. Although formed into a ring in this manner, each node may use other available ports for different connections as well.

Once a ring topology has been formed, a core bridge is selected (step 310). The core bridge is a ring node that includes both a ring component and a LAG component, as described in more detail with reference to FIG. 3. The core bridge must, as its name implies, communicate with the core network. In this embodiment, a virtual port is configured through which traffic from the ring is passed to the core network. Note that while in this embodiment one network node is selected as the core bridge, others may be functionally capable of doing so.

An access bridge may then be established (step 315). The access bridge is a ring node that also includes a ring component and a lag component, as described above. In this embodiment, communication traffic to and from UE devices is collected by one or more BTSs associated with the established access bridge. The access bridge will use the ring to aggregate this traffic to and from the core network.

In order to do this, according to this embodiment of the present invention, once the access bridge is established, LAG (link aggregation) protocol is enabled (step 320) for the ring. If necessary (as indicated by broken lines in FIG. 5), STP (spanning tree protocol) is disabled (step 325), as STP convergence is incompatible with this embodiment of the invention. In some embodiments (not shown), the method also includes detecting whether in fact STP is in use when the ring topology is formed at step 305.

According the embodiment of FIG. 5, a first VLAN is then configured (step 330). The first VLAN extends from a first port on the ring component of the access bridge to a first port on the ring component of the core bridge. A second VLAN is also configured (step 335), the second VLAN extending from a second port on the ring component of the access bridge to a second port on the ring component of the core bridge. As can be seen in FIG. 3, where VLANs 110 and 111 are illustrated, each node of the formed ring is allocated to one or the other VLAN, but not both. As noted above, however, each of the network nodes may join other VLANs or be connected in other ways through other ports.

Traffic from the access bridge to the core is then load balanced (step 340). That is, traffic from the access bridge is forwarded in a load-balanced fashion using LAG protocols. Traffic from the core network destined for the access bridge is load balanced on the first and second VLANs in a similar manner. This load balance routing is continued until the network is reconfigured (not shown) or until a fault is detected.

In this embodiment of the present invention, fault protection is also addressed. The ring network is checked for connectivity by transmitting CCMs (connectivity check messages) (step 345). An MEP in each LAG component port sends and receives CCMs toward its respective remote LAG component port via its respective VLAN. If no CCM is received as expected, a fault is presumed. Of course various factors may affect the delivery of CCMs, and a fault may in some embodiments not be presumed with the first missed CCM, but rather after a predetermined number of expected CCMs do not arrive within a given time period.

If a fault is detected (step 350), then the port corresponding to the faulty VLAN on the LAG component is removed from the aggregation scheme (step 355). This may, for example, involved the sending of a fault alarm to one or more other nodes, and preferably to the network operator as well (step not shown) so that appropriate action may be taken to alleviate the fault condition. In practice, of course, this involves simply reconfiguring the LAG component so that no traffic is provided to the VLAN that may no longer be used. All traffic from the access bridge to the core is then routed via the remaining (that is, operational) VLAN (step 360). For example, referring to FIG. 4, when a fault occurs between access bridge 160 and node 150, VLAN 111 cannot be used. In this example, at step 355 access bridge 160 would then continue direct all traffic to the core network 190 via VLAN 110, at least until the fault condition can be remedied.

In this regard, it is noted that a detected fault may or may not represent a real fault. That, is a false alarm may result from a failure to receive CCMs due to other reasons. Since there is no way of immediately determining if an alarm represents a real fault, of course, the port corresponding to the VLAN perceived to be faulty is removed from the aggregation scheme nevertheless. Optionally (as represented by the broken line in FIG. 5), the process may return to step 345 and send out CCMs as if both VLANs were operational. If fault condition is remedied, or if a perceived fault turns out not to be an actual fault, then the LAG components adjust and return to transmitting load balanced traffic on both VLANs at step 340.

Note that the method described above is intended to illustrate one embodiment of the present invention, but other embodiments consistent with the spirit of the invention may be implemented as well. For example, the sequence of steps described above may be performed in any logically-consistent order unless an embodiment specifies a particular sequence. Some steps, such as configuration of the first VLAN and the second VLAN, maybe performed simultaneously instead of sequentially. In addition, in some embodiments, the process of the present invention my include steps additional to those described above, in others, some steps may be deemed optional or not performed at all.

In this manner, the present invention provides a way of aggregating communication traffic, for example in a wireless backhaul environment implementing an Ethernet-ring access network. The present invention provides for the efficient use of network resources through load balancing, as well as enhanced fault protection. In most implementations, the solution of the present invention is both scalable and cost effective.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A network node operable in an Ethernet ring network, the network node comprising:
   a LAG (link aggregation) component comprising a first port operable for receiving communications from non-ring entities, and further comprising a second port and a third port operable for forwarding the received communications as untagged frames, wherein the forwarding includes load balancing the untagged frames between the second port and the third port; and
   a ring component operable to load balance traffic around a ring network by tagging frames received from the second port of the LAG component with an id of a first virtual local area network (VLAN) and tagging frames received from the third port of the LAG component with an id of a second VLAN, wherein the ring component includes:
      a first port operable for sending tagged frames to the core bridge on the first VLAN, wherein the first VLAN is configured to extend from the first port of the ring component of the network node to a first plurality of nodes in the ring and to the core bridge and;
      a second port operable for sending tagged frames with the second VLAN id to the core bridge via the second VLAN, wherein the second VLAN is configured to extend from the second port of the ring component of the network node to a second plurality of nodes in the ring and to the core bridge.

2. The network node of claim 1, wherein the ring component includes a third port and a fourth port for receiving untagged frames from, respectively, the second port and the third port of the LAG component and wherein the ring component of the network node is arranged so that untagged frames received at the third port of the ring component of the network node are forwarded as tagged frames on the first VLAN, and wherein the untagged frames received at the fourth port of the ring component of the network node are forwarded as tagged frames on the second VLAN and wherein the LAG component and the ring component are co-located in the same physical component and are capable of communicating with one another.

3. The network node of claim 2, wherein the LAG component load balances incoming untagged frames by forwarding the incoming untagged frames from one of the second port and the third port of the LAG component to one of the third port and the fourth port of the ring component.

4. The network node of claim 3, wherein the LAG component is further arranged to, upon receiving a notification that a fault affecting one of the first VLAN and the second VLAN has occurred, remove one of the second port and the third port corresponding with the path to the affected VLAN and forward all of the received communications on the one of the second or third ports of the LAG component that is not associated with the affected VLAN.

5. The network node of claim 4, wherein the LAG component is further arranged to, upon receiving a notification that the fault has been alleviated, restore the removed port of the LAG component and resume load balancing the untagged frames forwarded to the network node.

6. A method operable in an access bridge including a LAG component and a ring component of aggregating traffic to a core network via an access ring network comprising a plurality of network nodes, the method comprising:
   load balancing traffic from the access bridge to a core bridge connected to the core network by load balancing traffic between a first VLAN and a second VLAN by:
      forwarding untagged frames from a first port of the LAG component of the access bridge to a third port of the ring component of the access bridge for aggregation to the core network via the first VLAN, wherein the first VLAN includes a first portion of the plurality of network nodes extending from the access bridge to the core bridge in a first direction around the access ring network; and forwarding untagged frames from a second port of the LAG component of the access bridge to a fourth port of the ring component of the access bridge for aggregation to the core network via the second VLAN, wherein the second VLAN includes a second portion of the plurality of network nodes extending from the access bridge to the core bridge in a second direction around the access ring network.

7. The method of claim 6, wherein the access ring network is an Ethernet network.

8. The method of claim 7, further comprising detecting whether STP (spanning tree protocol) is being used for determining network routing paths.

9. The method of claim 8, further comprising disabling STP for the nodes of the access network.

10. The method of claim 6, wherein the LAG component of the access bridge is configured to be operable according to IEEE 8010.

11. The method of claim 10, wherein the ring component of the access bridge is configured to be operable according to IEEE 80 1 Q.

12. The method of claim 6, further comprising:
forwarding tagged frames from the ring component to a neighbor node on the first VLAN; and
forwarding tagged frames from the ring component to another neighbor node on the second VLAN.

13. The method of claim 6, further comprising performing a fault detection procedure.

14. The method of claim 13, wherein the fault detection procedure comprises sending and monitoring the receipt of CCMs (connectivity check messages).

15. The method of claim 14, further comprising detecting a fault condition affecting one of the VLANs and transmitting a notification to the LAG component.

16. The method of claim 15, further comprising, upon receipt of notification of a fault condition affecting one of the VLANS, forwarding untagged frames from the LAG component only for the unaffected VLAN.

17. A network node operable in a ring network, the network node comprising:

a link aggregation (LAG) component comprising:
a first port operable for receiving communications from non-ring entities;
a second port and a third port operable for forwarding the received communications as untagged frames, wherein the LAG component is operable to forward the untagged frames on the second port and the third port using a load balancing protocol; and a ring component operable to receive the untagged frames from the LAG component and to load balance traffic around the ring network by:
tagging frames received from the second port of the LAG component with an id of a first VLAN;
forwarding the tagged frames with the first VLAN id to the core bridge over the ring network via the first VLAN, wherein the first VLAN is configurable to include a first portion of the ring network in a first direction between the ring component of the network node and the core bridge;
tagging frames received from the third port of the LAG component with an id of a second VLAN;
forwarding the tagged frames with the second VLAN id to the core bridge over the ring network via the second VLAN, wherein the second VLAN is configurable to include a second portion of the ring network in a second direction between the ring component of the network node and the core bridge.

18. The network node of claim 17, wherein the ring component is operable to:
forward tagged frames with the first VLAN id from a first port of the ring component on the first VLAN; and
forward tagged frames with the second VLAN id from a second port of the ring component on the second VLAN.

19. The network node of claim 18, wherein the ring component is operable to:
perform a fault detection procedure, wherein the fault detection procedure comprises sending and monitoring the receipt of connectivity check messages (CCM).

20. The network node of claim 17, wherein the ring component is operable to:
upon receipt of notification of a fault condition affecting one of the VLANs, forwarding untagged frames from the LAG component to the unaffected VLAN and not forwarding untagged frames from the LAG component to the affected VLAN.

* * * * *